Jan. 16, 1962  C. J. AMATO  3,017,557
POSITION SERVO
Filed Feb. 19, 1960  3 Sheets-Sheet 1

Inventor
Carmelo J. Amato

Jan. 16, 1962     C. J. AMATO     3,017,557

POSITION SERVO

Filed Feb. 19, 1960     3 Sheets-Sheet 2

Inventor
Carmelo J. Amato

Jan. 16, 1962

C. J. AMATO 3,017,557

POSITION SERVO

Filed Feb. 19, 1960

Inventor
Carmelo J. Amato

United States Patent Office 3,017,557
Patented Jan. 16, 1962

3,017,557
POSITION SERVO
Carmelo J. Amato, Shaker Heights, Ohio, assignor to Thompson Ramo Wooldridge Inc., Cleveland, Ohio, a corporation of Ohio
Filed Feb. 19, 1960, Ser. No. 9,790
17 Claims. (Cl. 318—467)

This invention relates broadly to a position servo or actuator (more specifically of the angular motion type) having a minimum number of two-position elements and which may be used for converting or changing to or from a plurality of succession of conditions or positions of a common or unitary member from or to different arrangements of this minimum number of two-position elements or for translating indicia or numbers from one code or system to another and, in its preferred and exemplary embodiments, this invention converts from arrangements of the two-position elements (which may be considered as "bits" of information or input command) to angular positions of the unitary movable member and more specifically includes a reversible, rotary, electric motor and is intended for use as a digital analogue converter to change binary to decimal numbers.

It is a general object of this invention to provide an improved position servo of this general type having as its input or as its output a movable member having a plurality of positions and a number of two-condition elements which is of a trouble-free and efficient design having a reliable and positive action to always stop sufficiently close to any particular position from either direction of motion and yet having a small or minimum total number of two-condition elements relative to its larger number of different positions, to thus provide for a small or compact and a lightweight device of low construction cost, in which said member is preferably angularly movable into its plurality of positions.

Other and more specific objects of this invention reside in the provision of a circuit including a reversible, electric motor driven, angular position servo, whose total number of different angular positions is two to the exponent which is the number of two-josition or binary controlling switches therein, and more particularly, such a servo in which a motor initiated motion is smoothly stopped by an energy absorbing braking means or in which the several different increments of motions for any one operation are preferably always of the same type or in the same direction.

It is also an object of this invention to provide a position servo of the above described general type and having different numbers of units of position change or travel in an operation in which the accelerating travel, during which energy is supplied, is of at least the same general magnitude, or approximately equal to, the deceleration or braking travel, during which energy is absorbed or dissipated, for a single unit of travel in either direction to thereby be capable of maximum speeds of operation.

It is also an object of this invention to provide a position servo of the above described general type in which there need be no power consumption or current flow once the servo has reached any of its command positions or conditions.

Another object of the present invention resides in the provision of a position servo of the above described general type and including a braking means which servo is capable of operation at high speeds and yet is simple and reliable and more particularly such a servo in which there are approximately equal or nearly the same periods of time or lengths of travel for acceleration and deceleration of the multi-position member during its minimum or unit increment of motion in either direction.

A further object of this invention is to provide an improved digital to analogue converter for directly and positively translating binary numbers from any suitable source, such as the output of a logic device or circuit, into different angular positions of a readout corresponding to decimal numbers or corresponding to different control station position numbers for the controlling of some other device.

Another and more detailed object of this invention is the provision of a converter of this type including only a single reversible, rotary member or unit including a dynamically braked and reversible motor, a plurality of different sets of angular position determining and relatively moving contacts, a readout device, and a controlling circuit including means to distinguish between different simultaneous signals of different energy types from a plurality of multi-position controlling switches.

Other objects, features, and advantages of this invention will become more fully apparent, especially to those skilled in this art, from the following detailed description taken in conjunction with the accompanying drawing which illustrate a preferred embodiment and in which.

Figure 1:
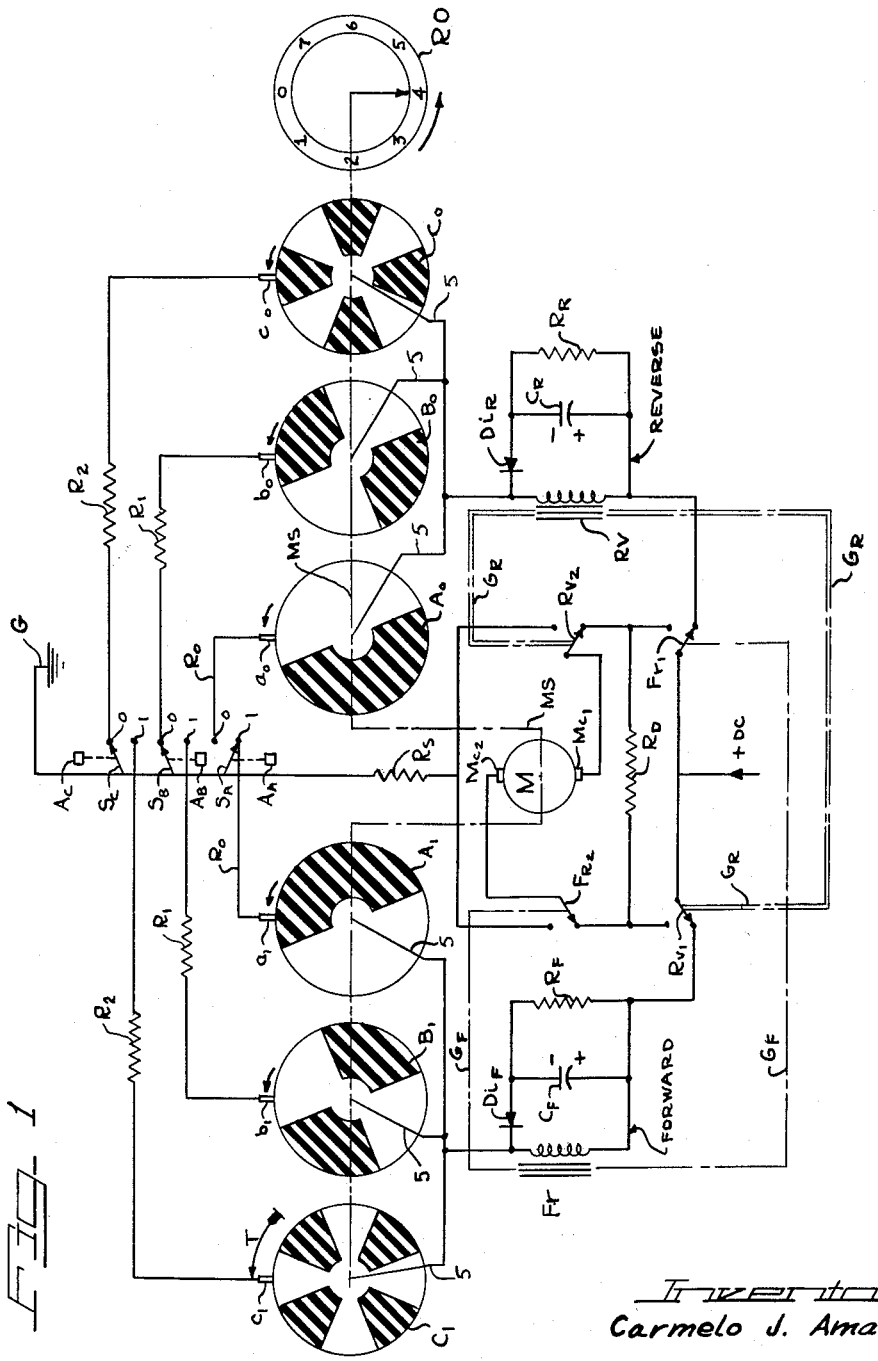
FIGURE 1 is a circuit diagram including a schematic or spread-out and diagrammatic illustration of the several electro-mechanical parts of a system or position servo according to this invention.

As shown in FIGURE 1, the main interconnected and moving sub-assembly (which is preferably one moving unit) of the servo device of the present invention comprises the suitable, reversible, electric motor M, the suitably connected plurality (here N or 3 or more sets of plus forward and negative reverse) of angular direction and position determining contact means such as the rotary wafer switches $C_1$, $B_1$, $A_1$, and a suitable angular position output such as the directly connected readout RO, all suitably connected to rotate as a unit, as by being coaxial and connected on a common shaft MS, as shown.

While it will be understood by those skilled in this art that the parts hereof may be arranged in various ways for different purposes such as the actuation of switches or controls, or the conversion, coding, or decoding of indicia or numbers into, as well as out of, binary numbers yet, in the present exemplary embodiments, the control portion of the device is intended to be from, or in terms of, a binary code (here the normal binary numbers) which are suitably supplied to the set of N two-position switches (for example, manually or by the output from a binary computor or logic device), instead of actuating these two position switches as an output for this device. Hence, here the control or input portion of the circuit includes a plurality or number N (here three) of two-position contact means such as the single pole, double throw, switches $S_A$, $S_B$ and $S_C$, each having suitable actuating means $A_A$, $A_B$, and $A_C$, respectively, which may be, for example, actuating relays connected into a logic circuit.

These N or three input or control switches are given distinctive outputs or signals so that they can be supplied simultaneously and yet distinguished. Thus, according to this invention, each supplies energy in a different manner. In the preferred embodiments of this invention, those different energy supplies or signals may be made different from each other by having each switch supplying a different transient D.C. current. This is done in the present embodiment by having a suitable resistance connected in each of the two sides, or the two outputs, of each such switch with different values for each switch.

As an example only and where the supply voltage is 28 volts D.C., the two resistances $R_0$ and $R_0$ may each be made very small or about zero, the two resistances $R_1$ and $R_1$ may each be 100 ohms, and the two resistances $R_2$ and $R_2$ may each be 200 ohms. It will be noted that the $R_2$ resistances are greater than the $R_1$ resistances and the $R_1$ resistances are greater than the $R_0$ resistances for a reason hereinafter to be explained.

As shown, these control switches have a common connection at their poles to ground G and each as a "1" or forward (plus) contact and a "0" or reverse (negative) contact which are connected in sets as shown in the several stator contacts or brushes $c_1$, $b_1$, $a_1$ and $c_0$, $b_0$, $a_0$, which radially engage the peripheries of the two sets of coaxial wafer switches $C_1$, $B_1$, $A_1$ and $C_0$, $B_0$, $A_0$, respectively. As illustrated, these segmental and rotary, angular direction and position determining means or wafer switches are of the radially engaged type although it will be understood that they, or similar means, may be of other types such as the face or axially engaged type with the several segments of a set of N (here 3) arranged on each side of a common disc in concentric patterns. It will also be noted that the shaded insulating areas and the unshaded conductive areas of the wafer switches are preferably equal and with the angular lengths of the segments of the "one" or forward set and of the lengths of the segments of the "zero" or reverse set having a one, two, four relationship as shown or a factorial type of relationship or, more particularly, a series of exponents type of relationship, here using the integer exponents of the binary 2, that is, $2^0$, $2^1$, $2^2$ . . .

For the values used here and with a binary or two-position input and N or the number of switches being three, the increment or unit of rotation or angular displacement is preferably taken as 45° The rotary conducting portions of each wafer switch are suitably connected, as through a conducting ring on their conducting shafts, by stator connections or brushes 5 leading, as shown, to the "Forward" motor starting circuit for the forward or "1" group of wafer switches and similarly to the "Reverse" motor circuit for the reverse of "zero" group of wafer switches.

The "Forward" motor energizing, relay circuit comprises a forward relay Fr which is suitably connected as by gang means $G_F$ to switches $Fr_1$ and $Fr_2$. While it will be understood that various known types of control means or circuits may be used, the preferred "Forward" circuit comprise this relay Fr, having the rectifying diode $Di_F$ connected across it, and being, in turn, in series with the condenser $C_F$ (which for the present 28 volt D.C. supply may be of 100 mf.). The resistor $R_F$ (which here may be of 1200 ohms) is connected in parallel with, or across, the condenser as shown.

The "Reverse" relay circuit is similar and comprises the relay Rv suitably connected as by gang means $G_R$ to switches $Rv_1$ and $Rv_2$ with the diode $Di_R$, the condenser $C_R$ and the resistor $R_R$ connected as shown and in the same fashion as in the forward circuit.

As indicated, the switches $Fr_1$ and $Fr_2$ energize the motor for rotation in its forward direction (which is here chosen as being counterclockwise) from the plus D.C. supply through to ground by means of the starting resistor $R_S$.

The current is supplied to the motor in the reverse direction, or in through $Rv_1$, $Fr_2$ (in its lower position), through $Mc_2$ to the motor and out through its outer connection $Mc_1$ through $Rv_2$ (in its upper position) and hence through the same starting resistor $R_S$ to ground, to thus energize and drive the motor in its reverse or clockwise direction.

It will be apparent that these identical forward and reverse motor controlling circuits each embody a means to distinguish between the differing energizations of the pairs of parallel sub-circuits. Here, this means is a time delay means supplied by the condensers $C_F$ or $C_R$. Each provides a time interval before it is fully charged and permits a sufficient current flow to energize the corresponding relay, such as Fr. Thus, these two condensers distinguish between the forward and reverse sub-circuits when simultaneously connected so that the largest current will act first and then the smaller currents in order of their magnitudes. During the charging of this condenser, a small value of current will flow through the resistor $R_F$ or the corresponding resistor $R_R$. The rectifiers or diodes $Di$ in the forward and in the reverse relay circuits prevent $C_F$ from holding in Fr on drop out and similarly $C_R$ from holding in Rv on drop out. Resistors $R_R$ and $R_F$ provide a discharge path for capacitors $C_R$ and $C_F$ respectively.

Thus if a plurality of signal or control currents are supplied simultaneously to the two motor starting circuits (i.e. the "Forward" and the "Reverse" circuits) these circuits will respond in the order of the magnitudes of the then connected currents, starting with the largest since it will charge its condenser more rapidly.

After the appropriate rotation of the motor, as initiated by the largest control or signal current value, is completed and that current is then shut off by having the corresponding conducting segment of its wafer switch moved around into an insulating or shut-off position, then the next largest current will act to additionally rotate the motor in the direction of existing motion or stop rotation depending upon the connecting arrangements of the wafer switches. In this manner, the most significant "bit" of input command which has not been nulled, first controls the direction of motion and then successively the next most significant and non-nulled "bit" takes control through all of the non-nulled "bits."

It is desirable that this angular position servo be free from error and reliable or positive in its action so that the stopping, decelerating, or braking distance is substantially or sufficiently uniform in either direction. Thus the overrun after any selected forward or reverse angular motion should result in reasonably or sufficiently regular integer locations for the stopping points of the rotor. Stated another way, the multi-position rotor should always be stopped, after either direction and any amount of previous motion, sufficiently close to an integer or decimal number point to clearly distinguish it from an adjacent one.

To this end, a suitable decelerating means or brake is supplied to slow and stop the rotation of the motor and its connected wafer switches upon the de-energization thereof. This brake may be of various suitable forms although, in the present embodiment, the dynamic braking resistance $R_D$ is preferred. As shown this braking resistance is immediately connected across the motor to supply dynamic braking as soon as switches $Rv_2$ and $Fr_2$ are moved to their lower positions upon de-energization by their circuits. Thus, in any position the motor M and its connected parts will have a certain amount of angular offset in one direction or the other, depending on the direction of its last rotation.

Figure 2:
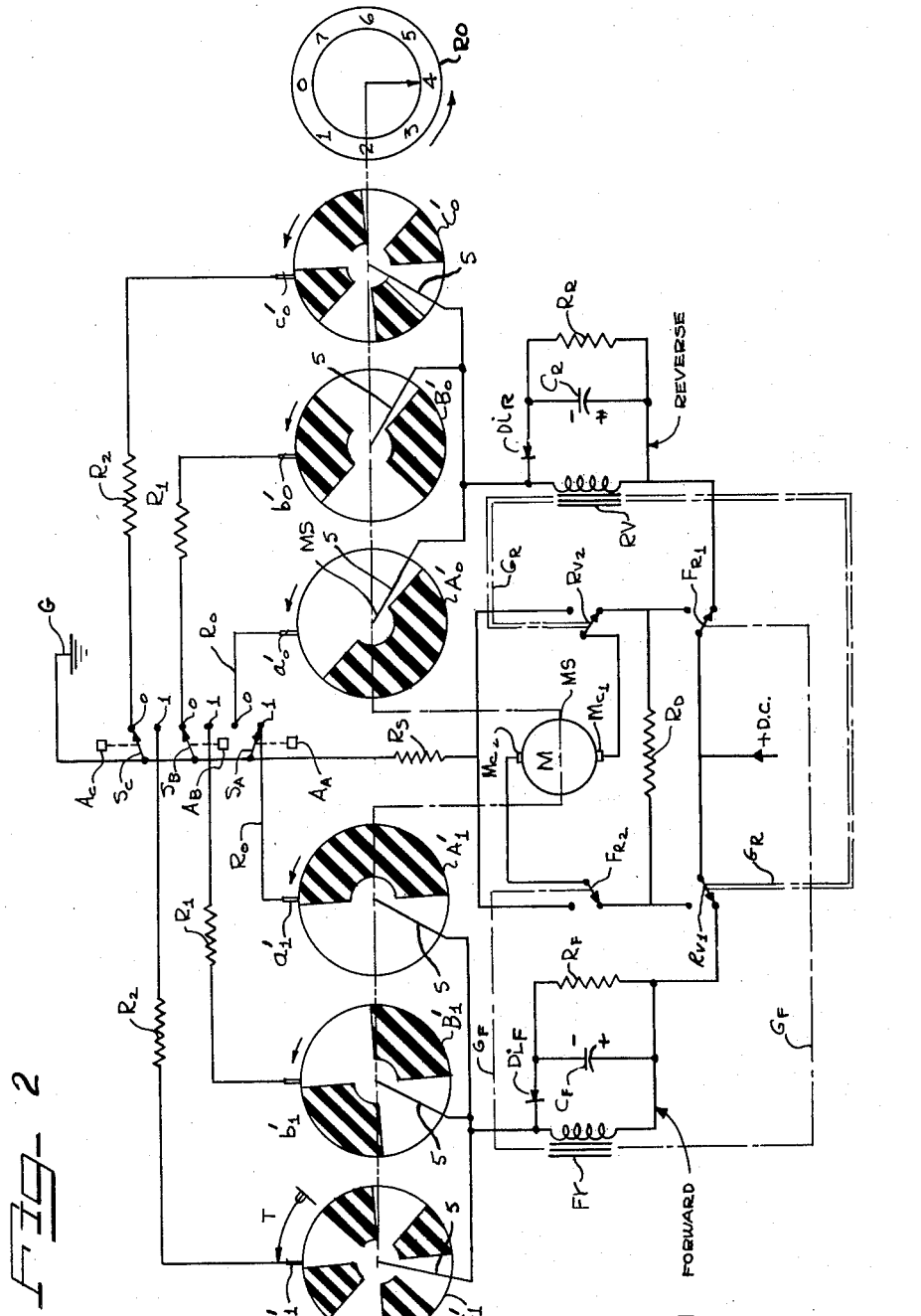
FIGURE 2 is a view similar to FIGURE 1 but having certain modifications therein as indicated by the differing reference characters, to illustrate a second embodiment of this invention.

It will be noted that both the forward and the reverse circuits are shown in FIGURES 1 and 2 as being in their de-energized positions with the dynamic braking resistance $R_D$ connected across the motor to stop it.

It will be noted that once either embodiment of this position servo has stopped moving after reaching its new position, all of its circuits are open and no current is consumed during this reset condition. Further, due to the relatively large or 1200 ohm resistors and high relay coil resistances, the relay circuit currents are quite low and hence may be switched or controlled by very small and compact wafer switches and very small and compact two position switching means such as $S_A$, $S_B$, and $S_C$ which last may be any type switching means suitable for such small currents, such as transistors, vacuum tubes or other means as will be understood by those skilled in this art.

It is to be noted that up to this point the description herein applies with equal facility to either of the two forms or species of FIGURE 1 or of the hereinafter further described FIGURES 2 and 3.

In the initial and preferred exemplary embodiment of FIGURE 1, the device is shown as being in its decimal "4" or its corresponding binary code "100" position and accordingly switch $S_A$ is in the lower or "1" position while switches $S_B$ and $S_C$ are in their upper or "0" positions. Also in this embodiment of FIGURE 1, the angularly equal and alternating conductive and insulating segments are arranged as shown and in a descending 4, 2, and 1 or a factorial or exponential relationship corresponding to $_2N^1$ or $2^2$, $2^1$ and $2^0$ in their effective angular lengths.

While other segmental angular relations may be used, it is to be noted that, in the present particular or specific embodiment of FIGURE 1, the segments of $A_0$ are angularly offset by 4 units (or 180°) relative to those of $A_1$, while the segments of $B_0$ are offset 2 units (or 90°) relative to $B_1$, while $C_0$ and $C_1$ are offset by one unit (or 45°).

At the end of any operation consisting of one to three of the above different increments of motion there will be an overrun or a decelerating or stopping period as noted above. Within the broader purview of this invention this overrun need not be exactly the same for both directions or for longer or shorter immediately previous motions so long as the rotor stops with its readout within an identifiable distance from the intended integer.

However, it is preferred that all such motions or travels be reasonably uniform with stop points close to the readout numbers to avoid any possibility of errors or misreading.

In this form of FIGURE 1, this overrun is, for the sake of convenience, illustrated as one-half of the minimum unit (here 45°) so that the overrun is shown as 22½° in the positive or counterclockwise direction, since the last, or the immediately previous, increment of motion was a counterclockwise turn of one unit in advancing from "3" to "4." The overrun would be substantially equal in the other or clockwise direction in the case of a previous reverse motion. Thus, there is a bracketing or embracing (preferably equal or approximately so) of the similarly disposed or vertically diametrical fixed or stator rim brushes of the forward set $a_1$, $b_1$, $c_1$ and of the reverse set $a_0$, $b_0$, $c_0$ by the (presently illustrated 22½°) overrun in either of its directions.

In considering FIGURE 1, it will be noted that its rotor will move from any one of its eight positions to any other selected one by appropriate combinations of 4, or zero, 2 or zero and 1 or zero units (45°) of motion. While not essential or necessarily so in all forms or in the broader aspects of this invention yet here (and in FIGURE 2) such complete operation is always composed of motions in the same direction, that is, it is not necessary, nor are there, any operations including both forward and reverse increments of motion.

It will be appreciated by those skilled in the art that the maximum speed of operation for practical and desirable forms of apparatus will be like an oscillatory motion phenomena. The highest speed will occur when the minimum or unit increment of travel (which is also the most commonly or frequently used) is achieved by motor power on (or acceleration) for approximately half of its distance and a preferably about equal deceleration for the remainder, or other half, of this total of a unit of travel. If desired this motion for a single unit of travel may be harmonic or substantially so.

Thus energy is used for about half of a unit of travel and is absorbed as in braking for the remaining half of a travel unit whether the increment of travel is 1, 2, or 4 units.

Figure 3:
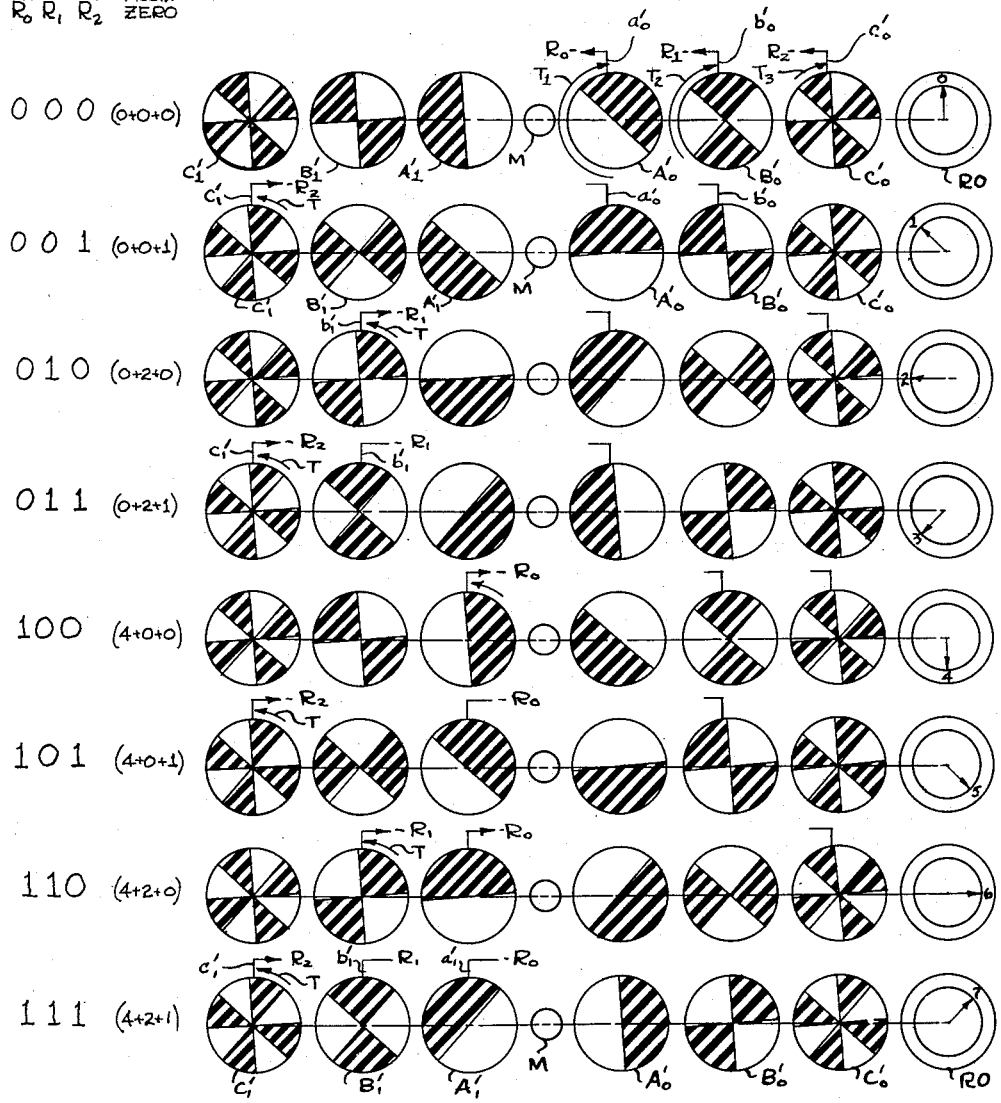
FIGURE 3 is a chart and position diagram schematically showing the several successive angular positions of only certain of the several parts of the device of FIGURE 2 and their interrelationship.

Another of the numerous possible variations or other forms of the invention is shown by the second exemplary embodiment of FIGURES 2 and 3. Here the same reference characters are used throughout for unchanged parts. Only the relative angular positions of the wafer switch segments, their much shorter overrun in either direction, and their forward to reverse relation are different so that only the wafer switches $A'_1$, $B'_1$, $C'_1$ and $A'_0$, $B'_0$ and $C'_0$ and the stator rim brushes $a'_1$, $b'_1$, $c'_1$ and $a'_0$, $b'_0$, $c'_0$ carry distinguishing reference characters.

Here, in FIGURE 2, the braking action is relatively much faster so that the overrun is much shorter, as shown. As noted above, the overrun is preferably about equal in both directions and is so illustrated. Thus, in this case, the stator or rim brushes or contactors of the forward set are angularly offset with respect to those of the reverse set with the stopping positions of the rotor in between or in the middle. Put another way, the forward and the reverse stator contactors embrace the stopping positions of the insulation to conductor boundaries or are equally and angularly offset on each side thereof. Here the divisions between conductive and non conductive segments of the "C" or unit wafer switches are indexed as closely as desired with the integer or number positions of the readout RO. This is in contrast to FIGURE 1 where the members of RO correspond angularly to the middles of both insulating and conductive segments of the "C" or unit wafer switches.

It is desirable that this angular position servo of FIGURE 2 be free from error and positive in its action, with a minimum of overrun or slippage after a given or selected angular motion. To this end, a suitable brake is supplied to almost immediately stop the rotation of the motor and its connected wafer switches upon the deenergization thereof. This brake may be of various suitable forms although, in the present embodiment, the dynamic braking resistance $R_D$ is preferred. As shown this braking resistance is immediately connected across the motor to supply dynamic braking as soon as switches $Rv_1$ and $Fr_1$ are moved to their lower positions upon deenergization by their circuits. Thus, in any position the motor M and its connected parts will be slightly angularly offset in one direction or the other, depending on the direction of its last rotation. This small overrun is exaggerated in the drawings. In this connection, it is also to be noted that the forward brushes or stator connectors $a'_1$, $b'_1$, and $c'_1$ are angularly offset from the angular positions of the corresponding reverse connectors $a'_0$, $b'_0$ and $c'_0$ by an amount which is preferably twice (or slightly more) than the amount of the above noted overrun. In other words, the motor unit always comes to rest ready to be actuated in either direction and with edges or boundaries of each of its forward and reverse conducting segments located in between the angularly offset stator connections of the two sides, as shown particularly in FIGURE 2, in which these angular offsets are exaggerated.

It will be noted that in going from 7 to zero in FIGURES 1 or 2, the first motion is a turn of four units in the negative or reverse direction by the negative, 180°, $A_0$ segment followed by a negative turn of two units by the intermediate 90° segment B and then a negative or clockwise direction turn of one unit by the 45° segment $C_0$ to thus give a total angular motion of minus four minus two minus one, or minus 7 units, to return the rotary unit from its 7 back to its zero position and offset it in the negative direction by the overrun.

In similar fashion in either embodiment, it will be apparent that the common rotary unit will turn (in either direction) from any position to any other position as selected by the $S_A$, $S_B$, and $S_C$ two position switches, using all of the various possible values of the permutations of the arrangements of four or zero, two or zero, or one or zero, in this order.

From the foregoing it will be apparent that, according to the teachings of this invention, various types of position servos or the like may be constructed with a minimum number of two position, binary units, whether these binary units be input switches or output relays or the like. This minimum number N, is the exponent of the binary number 2, to give a total of angular position, which is also the total of the permutations of the three binary elements.

Thus in the case of four controlling, two-position switches (together with the same number 4 of pairs of wafer switches using 22½° as the minimum unit), the total number of available angular positions would be two to the fourth power or sixteen. This material reduction in the total number of two-position members required is quite desirable and important in cases where a large number of angular positions is desired. It will be understood that an eight-position device is illustrated here only for the sake of simplicity and that much larger numbers may be used where desirable.

It will also be understood that this minimum number of two-position units, taken with the single or unitary rotary number comprising the motor, the wafer switches, and the readout, provides for a very compact and lightweight device of this type which is of low cost and is also relatively trouble free and easy to service because of its lesser number of parts.

The entire circuit may be considered as providing for connections between the N number of binary elements (such as $S_A$) to the same N number of pairs of angularly moving elements (such as $A_1$ and $A_0$) through the same number of simultaneously connected, parallel sub-circuits, to provide, together with the differing energy or current values (from the different resistances $R_1$, $R_2$ and $R_0$) and the differing energy or current detectors (i.e., the condensers $C_F$ or $C_R$ and their circuits), for all of the possible permutations (or 2 to the exponent N) of the possible operative inter-connections between the binary elements $S_A$, $S_B$ and $S_C$ and the same number N of the pairs of segmental rotary portions (i.e., $A_1$ or $A_0$, $B_1$ or $B_0$ and $C_1$ or $C_0$).

The translating or converting operation of this angular position servo may be readily understood by a consideration of the multi-position chart and the partial connections diagram of FIGURE 3, taken in connection with the above described circuits and controls of FIGURE 2. Referring to these two figures, it will be noted that FIGURE 2 is shown with its unitary rotor unit (the motor, the wafer switches, and the suitable readout RO) being in its decimal "4" or its binary "100" position and with the connections or switches $S_A$, $S_B$ and $S_C$ being in the "100" arrangement as shown. The rotor unit is shown as offset or an overrun slightly in the positive direction since it is considered as just having moved from "3" to "4." Also in FIGURE 3, in the separate position shown in each horizontal row, the connection (such as $b'_1$ or $c'_0$) are shown only for the then connected segmental discs and the addition of the arrow head and the resistance unit shows the previously acting segment.

FIGURE 3 shows, in its several vertically spaced rows, the successive zero to 7 (or 8) decimal positions.

To facilitate the more ready understanding of this chart of FIGURE 3, the left hand column gives the conditions (one or zero) for the $S_A$, $S_B$ and $S_C$ switches together with their corresponding resistances $R_0$, $R_1$ and $R_2$. It is to be noted that $R_2$ is the larger resistance and as indicated by its zero subscript, $R_0$ is the smallest or zero resistance.

The next column gives the total number of units turned from zero and the sum of the segments used and also indicates the relative lengths of the forward segments which are then connected in. The extreme right hand column shows the position of the decimal readout. It will be understood that any other suitable angular or rotary control member may be used in lieu of this readout RO.

As noted above, the arrangement (including the resistances are $R_0$, $R_1$, and $R_2$ taken with the time delay condensers $C_F$ and $C_R$), provides for a successive scanning through, and operations in order, from the larger to the smaller binary code positions. That is, the first or the $S_A$ column (corresponding to the first place in the three places of the binary code) will, if connected in, be the first to act in either its forward or its reverse direction and then $S_B$ and $S_C$ if connected in.

In the chart of FIGURE 3, showing all of the eight available angular positions for the unitary rotor, only the active or connected brushes (such as $a_1$) are shown, to thus facilitate the understanding of this chart. For the same reason the then connected in resistances (such as $R_2$) are indicated in connection with the corresponding connector (such as $C_1$), and the last angular travel (which has just been completed for each position as shown in FIGURE 2) is indicated by the arrow T showing the direction and the amount of the angular motion from the preceding position.

The amount of the overrun in any case will depend on the rapidity of the action of brake means $R_D$ and the inertia and friction of the rotor unit among other factors. Preferably the engaging or peripheral widths of the contactors or brushes (such as $a_0$) are relatively short.

It is to be understood that numerous or various changes or modifications in the connections, arrangements, or applications of devices according to the teachings of this invention may be made without departing from the spirit and scope of the novel concepts hereof and as defined in the appended claims.

I claim as my invention:

1. A position servo converter comprising circuit means including a movable member having a number of binary pairs of motion controlling, circuit control parts, each pair comprising a zero type and a one type of oppositely connected controls and only one of each pair being connected at any one position to provide, with said circuit means, a number of parallel circuits simultaneously transmitting different energy values for each such pair, a number of two condition, binary elements, said number being the same as the number of said pairs and the number of said simultaneously connected, parallel circuits, motor means connected in said circuit, means to actuate one of said movable member or said binary elements under the control of the other through the plurality of positions of said movable member, which plurality is two to the exponent which is the said number of said binary elements, and said circuit means including means to actuate said motor means in steps in order corresponding to the different energy values of the simultaneously connected parallel circuits.

2. A position servo comprising circuit means including an angular step-by-step and reversible rotor including as a part thereof a number of pairs of on-off motion controlling, circuit control parts, each pair comprising a zero type and a one type of oppositely connected controls and only one of each pair being connected at any one position to provide, with said circuit means, a number of parallel circuits simultaneously transmitting a different current for each such pair, a number of separate, two condition elements, said number being the same as the number of pairs and the number of said simultaneously connected, parallel circuits, and motor means connected in said circuit means to actuate one of said rotor or said two condition elements under the control of the other through the plurality of angular unit positions of said rotor which plurality is two to the exponent which is the said number of said two condition elements, said circuit means including energy storing, time delay means to actuate said motor means in steps in the order of decreasing currents of the then connected parallel circuits.

3. A digital and position, servo converter comprising a circuit means including an angular step-by-step and reversible rotor including a number of operatively connected pairs of on-off and motion controlling, circuit control parts, each pair comprising two units providing opposite connections and only one of each pair being connected at any one position to provide, with said circuit means, a number of parallel circuits having different resistances therein to simultaneously transmit a different current for each such pair with each pair corresponding to different and similarly factorially related numbers of units of angular motion of said rotor, a number of separate, two condition elements, said number being the same as the number of said pairs and the number of said simultaneously connected, parallel circuits, and motor means connected in said circuit means to actuate one of said rotor or said binary elements under the control of the other through the plurality of angular positions of said rotor which plurality is two to the exponent which is the said number of said elements, said circuit means including energy storing and time delay, condenser means to actuate said motor means in steps in order of the values of currents of the then connected parallel circuits.

4. A digital analog and angular position converter comprising circuit means including reversible electric motor means connected to rotate a readout means and to rotate a number of pairs of on-off circuit control parts, each determining the direction as well as the amount of angular motion of said motor means, each pair comprising two portions connected for opposite directions of rotation of said motor means and so that only one such portion of each pair is operatively connected in any one angular position thereof, said pairs providing, with said circuit means, simultaneously and operatively connected circuits supplying different types of energy and for different amounts of angular motions of said motor means, said circuit means including a number of binary, two condition, motor control elements, said number being the same as the number of said pairs of portions and also the same as the number of, and being respectively connected through, said simultaneously connected circuits, said circuit means providing, with said elements, means responsive to said different types of energy to actuate said motor in a predetermined order of differing amounts of angular motion for the then connected, parallel circuits.

5. A digital analog and angular position converter comprising circuit means including a rotary unit including as coaxial parts thereof and rotating therewith, a reversible electric motor means, a readout means, and a number of pairs of segmental, on-off circuit control portions, each determining the direction as well as the number of unit steps of angular motion of said motor means, each pair comprising two portions connected for initiating and stopping opposite directions of rotation of said motor means and whereby only one such portion of each pair is operatively connected in any one angular position of said rotary unit, said pairs providing, with said circuit means, simultaneously and operatively connected circuits of differing resistances and resulting values of current and controlling for different amounts of angular motions of said motor means, said different amounts of angular motions being factorially related, said circuit means including a number of binary, two condition, motor control elements, said number being the same as the number of said pairs of portions and also the same as the number of, and being respectively connected through, said simultaneously connected circuits, and said circuit means providing, with said elements, time delay, condenser means responsive to said different current values to actuate said motor in a predetermined order for the then connected parallel circuits to thus provide a total of angular positions which is the sum of the possible permutations of the said number of binary control elements.

6. A digital analog and angular position converter comprising circuit means including a reversible electric motor connected to rotate a readout means and a number of pairs of on-off motor controlling segmental means of differing numbers of units of length determining the direction as well as the amount of angular motion of said motor, each pair comprising two segmental means each connected to control opposite directions of rotation of said motor and whereby only one of such segmental means of each pair is operatively connected in any one angular position, said pairs providing, with said circuit means, simultaneously and operatively connected circuits supplying different types of energy and for different numbers of units of angular motion of said motor means, a dynamic, motor braking resistance, connected across said motor upon its deenergization, said circuit means including a number of binary, two condition, motor control elements, said number being the same as the number of said pairs of segmental means and also the same as the number of, and being respectively connected through, said simultaneously connected circuits, said circuit means having, with said elements, a first relay circuit for the forward, and a second relay circuit for the reverse, energization and direction of rotation of said motor, each including means responsive to said differing types of energy to actuate said motor in a predetermined order to motions of differing amounts corresponding to the then connected parallel circuits.

7. A digital analog and angular position converter comprising circuit means including a reversible electric motor connected to rotate a readout means and a number of pairs of on-off motor controlling segmental means of differing numbers of units of length determining the direction as well as the amount of angular motion of said motor, each pair comprising two segmental means each connected to control opposite directions of rotation of said motor and whereby only one of such segmental means of each pair is operatively connected in any one angular position, said pairs providing, with said circuit means, simultaneously and operatively connected circuits supplying different types of energy and for different numbers of units of angular motion of said motor means, a dynamic, motor braking resistance, connected across said motor upon its deenergization at the mid part of a unit length of angular motion of said motor to stop said motor close to the end of said unit of angular motion in either direction, said circuit means including a number of binary, two condition, motor control elements, said number being the same as the number of said pairs of segmental means and also the same as the number of, and being respectively connected through, said simultaneously connected circuits, said circuit means having, with said elements, a first relay circuit for the forward, and a second relay circuit for the reverse, energization and direction of rotation of said motor, each including means responsive to said differing types of energy to actuate said motor in a predetermined order of motions of differing amounts corresponding to the then connected parallel circuits.

8. A digital analog and angular position converter comprising circuit means including a reversible electric motor connected to rotate a readout means and a number of pairs of on-off motor controlling segmental means of differing numbers of units of length determining the direction as well as the amount of angular motion of said motor, each pair comprising two segmental means each connected to control opposite directions of rotation of said motor and whereby only one of such segmental means of each pair is operatively connected in any one angular position, said pairs providing, with said circuit means, simultaneously and operatively connected circuits supplying different types of energy and for different numbers of units of angular motion of said motor means, a dynamic, motor braking resistance, connected across said motor upon its deenergization close before the end of a unit length of angular motion of said motor to stop said motor substantially at the end of said unit of angular motion in either direction, said circuit means including a number of binary, two condition, motor control elements, said number being the same as the number of said pairs of segmental means and also the same as the number of, and being respectively connected through, said simultaneously connected circuits, said circuit means having, with said elements, a first relay circuit for the forward, and a second relay circuit for the reverse, energization and direction of rotation of said motor, each including means responsive to said differing types of energy to actuate said motor in a predetermined order of motions of differing amounts corresponding to the then connected parallel circuits.

9. A digital, position servo, converter comprising circuit means including a movable member having a plurality of positions and a number of two condition, binary elements having a total of permutations providing binary numbers corresponding to each one of said plurality of positions, motor means to actuate one of said movable members or said binary elements in response to a control by the other, said movable member having a plurality of pairs of parts controlling said motor means, each pair being connected to correspond to different amounts of motion of said movable member and the parts of each pair being connected to correspond to opposite directions of motion of said movable member, said circuit means including means supplying a different type of energy for each different binary element thereof, each through one of the same number of simultaneously connected, parallel circuits, and means responsive to said different types of energy to energize and actuate said motor means in a predetermined order of steps corresponding to said parallel circuits and to the number of said binary elements, which is the same as the number of said parallel circuits.

10. A digital, position servo, converter comprising circuit means including a reversible rotatable member having a plurality of angular positions and a number N of two condition, binary elements having a total of permutations thereof providing binary numbers corresponding to each one of said plurality of positions, motor means to actuate one of said movable member or said binary elements in response to control by the other, said rotatable member having the same number N of pairs of parts controlling said motor means, each pair being connected to correspond to a different amount of angular motion of said rotatable member and the parts of each pair being connected to correspond to opposite directions of motion of said rotatable member, said circuit means including means supplying the same number N of different values of current, one for each of said N pairs of parts, each through one of the same number N of simultaneously connected, parallel circuits, and means responsive to said different values of current to energize and actuate said motor means in a predetermined order of steps corresponding to said N parallel circuits and to the said N binary elements in the order of their decreasing binary code position values.

11. A digital analog converter comprising circuit means including a number N of two condition, binary, control elements each having two oppositely acting parallel circuits, a rotor having a plurality of angular positions equal to the sum of the permutations of said binary elements and including a reversible electric motor, a readout means, and the same number N of pairs of segmental means of differing angular lengths each rotatively engaged with one of said parallel circuits to determine the direction and the amount of angular motion of said motor by the selected one of the said two circuits of each binary pair of elements and by the thus selected one of the N pairs of segmental means respectively, means supplying a distinguishable electrical value for each of said connected control elements, and means responsive to said electrical values to successively actuate said reversible electric motor for steps of forward or of reverse angular motions in the order of decreasing binary position values of said N binary control elements.

12. A digital analog converter comprising circuit means including a number N of two condition, binary, control elements each having two oppositely acting parallel circuits, a reversible electric motor having a plurality of angular positions equal to the sum of the permutations of said binary elements and connected to actuate a readout means and to actuate the same number N of pairs of segmental means of differing numbers of units of angular length, each rotatively engaged with one of said parallel circuits to determine the direction of angular motion of said motor in each operation thereof by the selected one of each pair of circuits of each binary element and to determine the number of units of each of always forward increments angular motions for each forward operation of said motor, and similarly the number of units of each of the always reverse increments of angular motion for each reverse operation thereof, by the thus selected ones of the N pairs of segmental means to provide a final angular position corresponding to the sum of either its selected forward or its selected reverse increments of unit angular motions, means supplying a different current value for each of said connected control elements, means responsive to said different current values to successively actuate said reversible electric motor for forward or the reverse unit angular steps in the order of decreasing binary position values of said N binary control elements, and brake means connected to stop the angular motion of said motor upon deenergization thereof.

13. A position servo comprising three two condition elements each operatively connecting one of a pair of parallel circuits in either of its said conditions and determining a distinguishable energization, a movable member having eight positions each corresponding to different arrangements of said elements and three coaxial pairs of parts for different numbers of units of motion, each said part connecting only one of each said pair of parallel circuits, motor means to actuate one of said elements or said movable member upon the controlling actuation of the other, and circuit means including said elements, said parts, said motor means and means to distinguish between said energizations to actuate said motor means in order for successive actuation for simultaneously connected parallel circuits of distinguishable energizations.

14. A position servo comprising a number N of pairs of forward and reverse parallel circuits, each pair including a two condition element, a movable means having a plurality of positions and N pairs of forward and reverse, on-off moving switching parts corresponding to different numbers of units of motion of said means, and circuit means including said elements, said parts, two direction motor means to actuate one of said elements or said movable means upon the actuation of the other, means to supply distinguishable energizations for each said N pairs of circuits, and means to distinguish therebetween so that said motor means acts successively in either direction upon simultaneous connections of said circuits whereby said plurality of positions of said movable means is two to the exponent N.

15. A transposing converter comprising a number N of pairs of forward and reverse circuit portions, each pair including a two condition element, means having a plurality of more than four unit conditions and N pairs of forward and reverse, on-off switching means, each such pair corresponding to a different number of units of said conditions, and circuit means including said circuit portions, said multi-condition means, actuating means to change one of said two condition elements on said multi-condition means upon the actuation of the other to convert data from one system of notation to another, means to supply distinguishable energizations for each of said N pairs of circuit portions, and means to distinguish therebetween so that said actuating means acts successively in order and in either direction for said distinguishable energizations upon simultaneous connections of said circuit portions whereby there is the relatively large plurality of said unit conditions of said means corresponding to the relatively small N number of pairs of said circuit portions and their two condition elements.

16. A position servo comprising circuit means including control means to supply a number of differing pairs of forward and reverse control currents, angularly movable and reversible means having a plurality of more than four angular positions and including a number of interconnected pairs of forward and reverse contacts providing different and factorially related numbers of angular unit travels for such pairs and means to distinguish between said differing currents and to simultaneously connect a plurality of said contacts for forward or reverse motions in a predetermined order to provide for a plurality of angular positions for said number which is the sum of the permutations of the connected number of said differing pairs of control currents.

17. A position servo comprising circuit means including control means to supply a number of differing pairs of forward and reverse control currents, angularly movable and reversible means including accelerating motor means and decelerating brake means and having a plurality of more than four angular positions and including a number of interconnected pairs of forward and reverse contacts providing different and factorially related numbers of angular unit travels for such pairs and means to distinguish between said differing currents and to simultaneously connect a plurality of said contacts for forward or reverse motions in a predetermined order to provide for a plurality of angular positions for said number which is the sum of the permutations of the connected number of said differing pairs of control currents, said motor means being connected to act for approximately half of a single unit of angular travel and said brake means then being connected in to act for the remaining approximate half of said unit of angular travel to thereby permit high operating speeds.

References Cited in the file of this patent
UNITED STATES PATENTS

| | | |
|---|---|---|
| 2,676,289 | Wulfsberg et al. | Apr. 20, 1954 |
| 2,798,994 | Dicke | July 9, 1957 |
| 2,802,978 | Legros et al. | Aug. 13, 1957 |
| 2,810,875 | Mayer et al. | Oct. 22, 1957 |
| 2,814,013 | Schwerghofer | Nov. 19, 1957 |